United States Patent Office 3,519,711
Patented July 7, 1970

3,519,711
COMPOSITION AND METHOD OF TREATING PRURITIC CONDITIONS OF THE SKIN
Robert E. Svigals, 11 Woods Lane,
Roslyn, N.Y. 11576
No Drawing. Filed Sept. 1, 1967, Ser. No. 664,940
Int. Cl. A61k 27/00
U.S. Cl. 424—148      2 Claims

ABSTRACT OF THE DISCLOSURE

An antipruritic composition in the form of an aqueous solution containing phenol, boric acid, and magnesium sulfate, and a method for ameliorating a pruritic skin condition therewith.

---

This invention relates to a composition of matter for treatment of pruritic conditions of the skin to reduce or eliminate itching thereof.

Phenol or carbolic acid is known to have germicidal, bacteristatic, and antipruritic action on human or animal skin, but its use for these purposes has in the past been extremely limited because of the several disadvantages and complications accompanying such use. Thus, phenol in concentrated or dilute form exerts a caustic and irritating effect on the intact skin and may even be absorbed and reach the circulation through unabraded skin, thus producing systemic toxic effects. The substance further has a disagreeable odor and its solutions tend to become discolored and to crystalize relatively rapidly. Antipruritic compositions have further tended to stain the clothing and to be generally unstable and/or cloudy, etc.

It is an object of this invention to provide an antipruritic composition, method of making same, and method of using same, which will not be subject to one or more of the above disadvantages. Other objects and advantages will appear as the discussion proceeds.

The attainment of the above objects is made possible by my invention which includes the provision of an antipruritic composition of matter consisting essentially of an aqueous solution containing approximately, per gallon, 3 to 7 fluid drams of phenol, 3 to 5 ounces of boric acid, and 1 to 2 pounds of magnesium sulfate.

The antipruritic compositions of this invention are substantially clear, colorless water-white solutions which have been found to be stable to temperature changes, light and/or other environmental conditions. In use, they do not penetrate the unabraded skin, do not have a local irritating effect thereon, and exert a topical soothing action and mild antiseptic effect on the skin. Nor do they stain clothing, forming only a faint white film on the skin after application thereto, which film can be readily brushed off. These compositions have been found to be substantially completely effective as an antipruritic agent in relieving itching within about 1 to 2 minutes after application to the skin. They are highly useful as antipruritic agents for the elimination, relief or amelioration of itching resulting from or accompanying a variety of conditions including poison ivy, mosquito and other insect bites, contact dermatitis and numerous other allergic skin reactions and psoriasis. They are effective on humans and animals, domesticated or otherwise, including dogs and other household pets.

The phenol or carbolic acid employed in the compositions of this invention is preferably employed in a concentrated liquid form to facilitate solution during preparation of the compositions. It may however also be emloyed in solid and/or crystalline form. The boric acid is likewise preferably employed in the form of crystals to facilitate and expedite solution. Magnesium sulfate is also, for similar reasons, preferably employed in granular or crystalline form. Although it may be employed in pure form or in the form of kieserite ($MgSO_4 \cdot H_2O$), it is preferably employed in the form of the more readily available, economical, and soluble form of Epsom salt ($MgSO_4 \cdot 7H_2O$). The water employed in these compositions is preferably distilled water to avoid the danger of contaminating the skin and/or introducing minerals or other materials which may deleteriously affect the stability, appearance and/or desired effectiveness of these compositions.

The compositions of this invention are preferably prepared by first dissolving the boric acid and magnesium sulfate with vigorous agitation in the water at an elevated temperature generally above about 140° F. to the boiling point and preferably about 180° F. The phenol is then added in addition to any other optional substances such as perfumes, tinting agents, UV absorbers, etc. Any undissolved material is then filtered off. Desirably, an incomplete amount of water is initially employed for dissolving the various components, the balance of the water required to complete the formulation being subsequently added, for example after cooling and filtering.

For treatment to ameliorate itching, the affected area of the skin is simply weted with the compositions of the invention and the treated area permitted to dry. Application to the skin may be in any desired manner as by hand, absorbent applicator such as gauze or fibrous cotton, spray, etc. These compositions may be made available or dispensed in glass or plastic squeeze bottles, in the form of individually wrapped impregnated cloth or paper pads, aerosol or plunger type spray devices, etc. These compositions should of course be employed for external use only and should not be allowed to contact eyes, mucous membranes and abraded skin.

The following example is only illustrative of a preferred embodiment of this invention and is not to be regarded as limitative. All parts and proportions referred to herein and in the appended claims are by weight unless otherwise indicated.

EXAMPLE

Phenol (88% conc., aqueous liquid)—6 fluid drams.
Boric acid (crystals)—4 ounces, avoid.
Epsom salt, U.S.P. ($MgSO_4 \cdot 7H_2O$, granules)—3 pounds, avoid.
Oil of geranium—30 drops
Distilled water, q.s. to make 1 gallon The above formulation for preparing a gallon of a solution according to the present invention is prepared by heating ⅔ of a gallon of distilled water to about 180° F. and dissolving the boric acid therein with vigorous agitation. The Epsom salt is then added slowly at the same temperature with constant agitation until the entire amount is dissolved. The phenol and oil of geranium are then added in sequence and the mixture filtered to remove undissolved chemicals. The remaining distilled water to make up a gallon of solution is added before or after filtration. The resulting solution is stable, clear, pleasant, and colorless and exerts an excellent antipruritic effect when an effective amount is applied to the affected area of the skin.

I claim:
1. An antipruritic composition for application to the skin consisting essentially of 6 fluid drams of liquid phenol, 4 ounces of boric acid, 3 pounds of Epsom salts, 30 drops of oil of geranium and sufficient water to make 1 gallon of said composition.
2. A process for amelioration of a pruritic skin condition comprising applying topically to the affected un- abraded area of the skin an antipruritic amount of the composition of claim 1.

References Cited

Pharmaceutical Formulations, p. 24, 1953.
Cosmetic Dermatology, p. 506, 1936.
British Pharmaceutical Codex, p. 324, 1959.
Remington: Pharmaceutical Sciences (I), 1965.
Remington: Pharmaceutical Sciences (II), 1965.
Sollman: Manual of Pharmacology, pp. 878–79, 1942.

ALBERT T. MEYERS, Primary Examiner

H. M. ELLIS, Assistant Examiner

U.S. Cl. X.R.

424—154, 346